July 1, 1969
J. M. ANGLIN
3,453,535
CAPACITANCE TEST INSTRUMENT USING PARTIAL DISCHARGE TIME
INTERVAL MEASUREMENT
Filed Oct. 20, 1967
Sheet 1 of 2
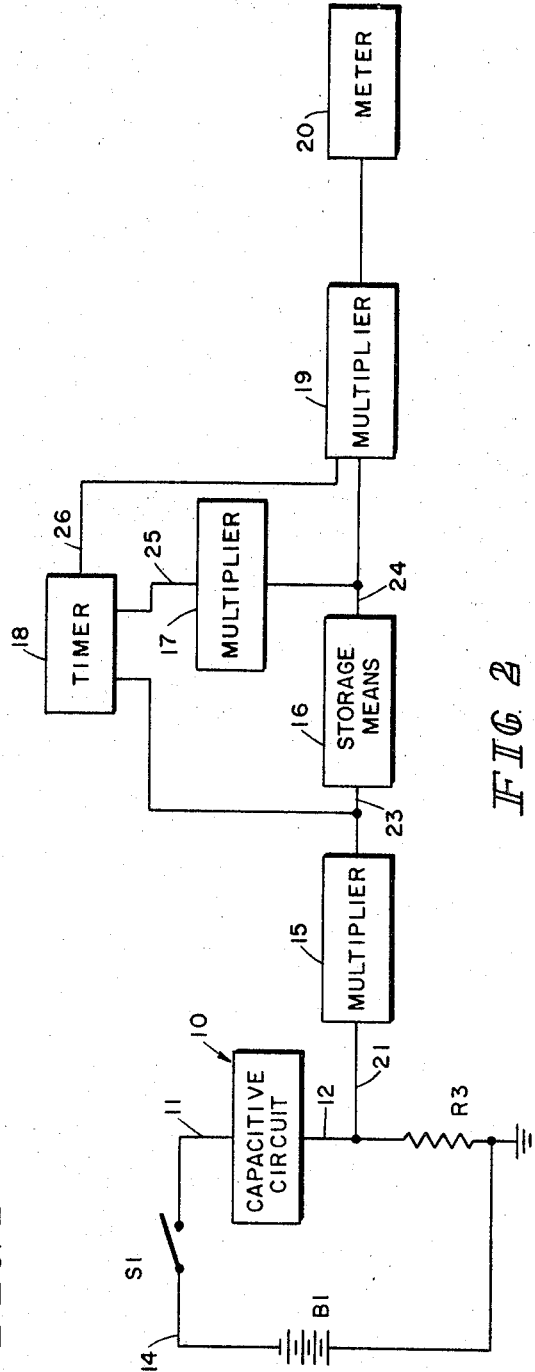
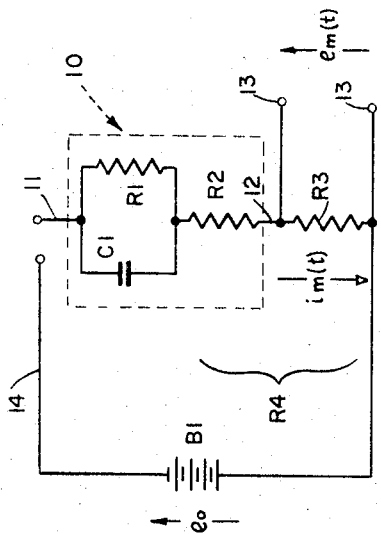
INVENTOR
JAMES M. ANGLIN
BY Robert Levine
ATTORNEY

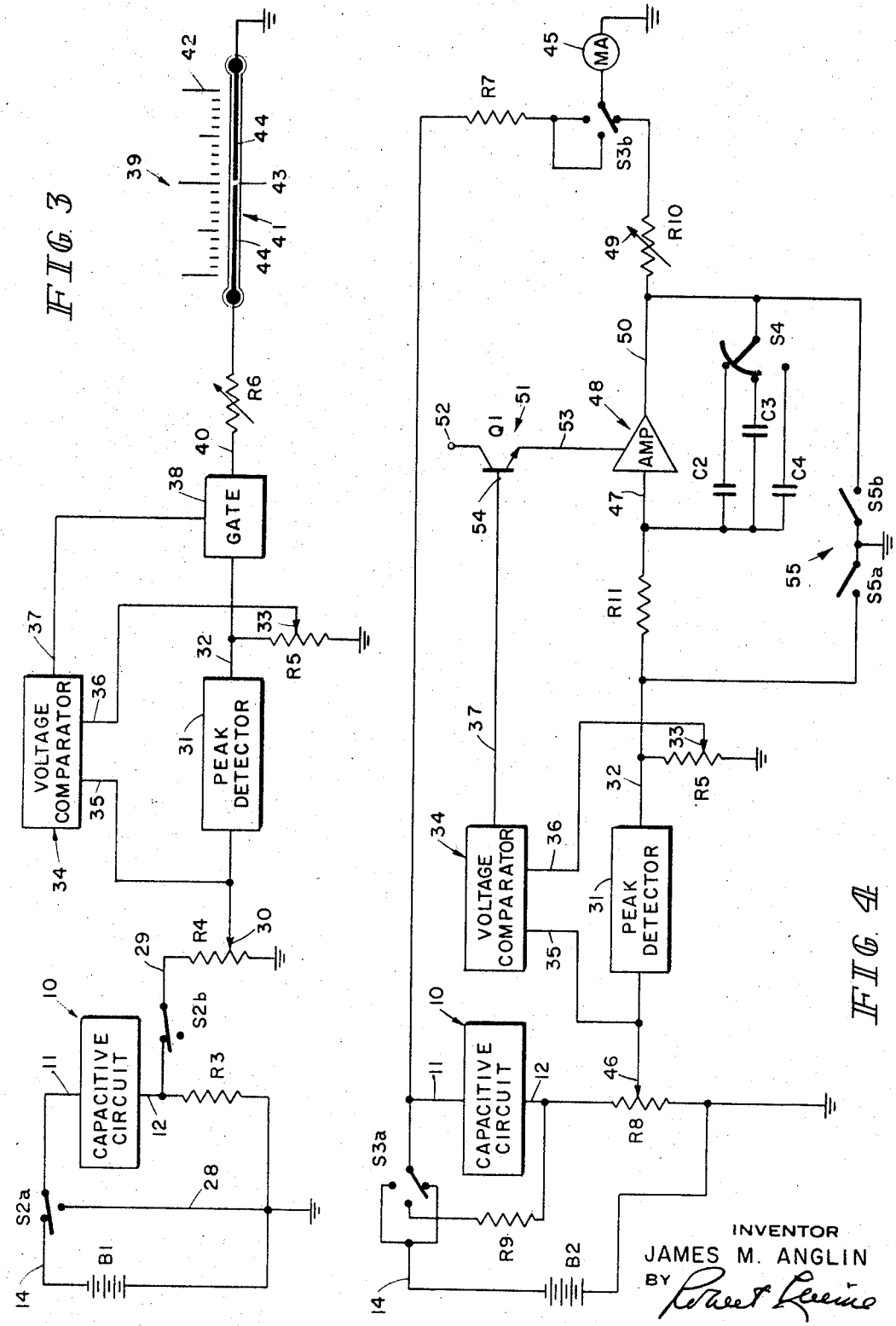

3,453,535
CAPACITANCE TEST INSTRUMENT USING
PARTIAL DISCHARGE TIME INTERNAL
MEASUREMENT
James M. Anglin, Indianapolis, Ind., assignor to P. R.
Mallory & Co., Inc., Indianapolis, Ind., a corporation
of Delaware
Filed Oct. 20, 1967, Ser. No. 676,858
Int. Cl. G01r 27/26, 11/52
U.S. Cl. 324—60                 17 Claims

ABSTRACT OF THE DISCLOSURE

A capacitive circuit containing unknown resistances is charged from a known potential through a current sensor. A signal proportional to the charging current is adjusted by a multiplier and its initial value is retained in a storage circuit. A timer measures an interval required for the signal to decrease to a preset fraction of its initial value. Signals representing this initial value and the time interval are combined in a multiplier and applied to a meter calibrated in terms of the capacitance of the capacitive circuit.

---

The present invention concerns test instruments for measuring capacitance, and relates more particularly to instruments employing a DC charging potential to determine the capacitance of capacitive circuits having series and shunt resistance associated therewith.

Measurement of the capacitance of electrolytic capacitors is complicated by the fact that such capacitors often exhibit significant resistance in series with their terminals and finite shunt or leakage resistance across their terminals. These effects are inherent in the capacitors and cannot be physically removed for capacitance measurements.

These resistive effects become particularly objectionable when it is desired to test the capacitance of a batch of solid, oxide-coated anodes during the manufacture of eletcrolytic capacitors. The formation of these anodes in a bath requires that the capacitance be monitored in order to determine the time at which the design capacitance has been reached by sufficient growth of the oxide coating. Conventionally, a batch of anodes is connected to a potential source and immersed in the bath until a predetermined formation voltage has been attained. The anodes are then removed from the bath; several of the anodes are removed and destructively tested for capacitance. This process, which is repeated until the rated capacitance has been achieved, is wasteful of both time and materials.

Another type of instrument provides on on-line measurement which obviates many of the defects of the more conventional procedure. The present instrument, however, operating under a different principle, requires fewer and less expensive components and requires a shorter measurement time.

Accordingly, it is an object of the present invention to provide an instrument for testing capacitance in the presence of unknown series and shunt resistances, which instrument is inherently compensated for leakage resistance. It is also an object of the invention to provide such an instrument which employs fewer and less expensive components than other instruments of its type. Another object is to provide an instrument having a brief measuring interval. A further aspect of the invention relates to the means and instrumentalities thereof, whether or not employed for similar purposes or within the fields primarily contemplated by the disclosure.

Other objects and advantages of the invention, as well as the modifications obvious to those skilled in the applicable arts, will become apparent from the following description of several preferred embodiments taken in conjunction with the accompanying drawing, in which:

FIGURE 1 is a schematic diagram including a capacitive circuit to be tested;

FIGURE 2 is a block diagram of an instrument according to the invention;

FIGURE 3 shows another form of instrument according to the invention; and

FIGURE 4 shows a third form of instrument according to the invention.

Referring more particularly to FIGURE 1 of the drawing, the reference numeral 10 indicates generally a capacitive circuit having two externally available leads 11 and 12. The circuit 10 may be conceptualized as a pure capacitance C1, an equivalent shunt resistance R1 and an equivalent series resistance R2; these components do not, however, normally exist as individual, lumped circuit elements. A current sensor, here shown simply as a known resistance R3, is placed in series with the circuit 10 and is provided with a pair of terminals 13, 13 for obtaining a measurable voltage signal $e_m(t)$ which is proportional to the time-dependent current $i_m(t)$ flowing through the circuit 10. Starting with the capacitance C1 in a relaxed condition, the leads 11 and 14 are connected together at a time $t=0$ in order to charge the circuit 10 from a source B1 having a constant potential $e_0$.

A time-domain analysis of the response of the circuit in FIGURE 1, rearranged into a form particularly suitable for the present purpose, reveals that, for $t>0$, $$(1) \quad e_m(t) = \frac{e_0 R_3}{R_1 + R_4}\left[1 + \frac{R_1}{R_4}\operatorname{EXP}\left(-\frac{R_1+R_4}{R_1 R_4 C_1}t\right)\right]$$

where $R_4 = R_2 + R_3$ and where "EXP" denotes the exponential function. For a time immediately after the leads 11 and 14 are connected together, i.e., for $t=0+$, Eq. 1 shows that $$(2) \quad R_4 = \frac{e_0 R_3}{e_m(0+)}$$

Differentiation of Eq. 1 and substitution of $t=0+$ therein gives the result $$(3) \quad C_1 = -\frac{e_0 R_3}{R_4{}^2\left(\frac{de_m}{dt}0+\right)}$$

which, upon substitution for $R_4$ from Eq. 2, becomes $$(4) \quad C_1 = -\frac{e_m{}^2(0+)}{e_0 R_3\left(\frac{de_m}{dt}0+\right)}$$

Since an exponential curve is nearly linear within an appreciable neighborhood of its origin, the derivative in Eq. 4 may be approximated by a finite difference over an interval $0+ < t < \tau$. Furthermore, since accuracy of the approximation depends upon the fraction of the curve's time constant occupied by the above interval, and since the time constant is defined in terms of a percentage change in the height of the curve, the time $\tau$ may conveniently be chosen to be the time required for the voltage across R3 to decrease to a predetermined fraction $\delta$; that is, $e_m(\tau) = \delta e_m(0+)$, so that the derivative in Eq. 4 becomes $$(5) \quad \left(\frac{de_m}{dt}\right)0+ \simeq \frac{\delta-1}{\tau}e_m(0+)$$

Although the precise fraction of circuit time constant resulting from the choice of a particular $\delta$ cannot be determined except for the case where $R_1 \gg R_4$, the value of $\delta$ may be made sufficiently close to unity that the actual time-constant fraction for a given worst-case condition (e.g., for $R_1 = R_4$) does not significantly affect the accuracy of the approximation for any value of $R_4$ within a specified, semi-infinite range.

Finally, substituting Eq. 5 into Eq. 4 yields (6) $$C_1 = \frac{\tau e_m(0+)}{e_0 R_3 (1-\delta)}$$

for the value of C1 in terms of quantities measurable within the circuit of FIGURE 1. Since the denominator terms are known parameters external to the circuit 10, Eq. 6 reduces to the product of a constant term K and two variables; that is, to (7) $$C_1 = K \tau e_m(0+)$$

Referring now to FIGURE 2, it may be seen that an instrument for measuring the capacitance of the circuit 10 from the relationship of Eq. 7 contains a potential source B1 for charging the circuit 10, a current sensor R3 for providing a signal proportional to the current through the circuit, and a first multiplier 15 for scaling the sensor signal in accordance with a predetermined factor. A storage means 16 holds an initial signal from the multiplier 15, and a second multiplier 17 is connected to the storage means to provide a signal which is a preset fraction of the signal held by the storage means. A timer 18 is coupled to the current sensor R3 and to the multiplier 17 to provide a timing signal indicative of an interval during which the current-sensor signal exceeds a signal from the multiplier 17. A third multiplier 19, coupled to the timer 18 and to the storage means 16, combines the timing signal and the initial signal into an output signal. A meter 20, coupled to the multiplier 19, then displays the capacitance of the circuit 10 by its indication of the magnitude of the output signal.

When the relaxed circuit 10 is charged from B1 by closing the switch S1 at a time $t=0$, a voltage $e_m(t)$ is carried by a lead 21 from $R_3$ to the multiplier 15, where it is scaled in accordance with the constant factor K of Eq. 7. The factor K may alternatively be entered at some other point in the instrument (for instance, in the multiplier 19 or in the meter 20), so that the multiplier 15 may merely connect together the leads 21 and 22, thus providing a multiplication factor of unity. Entering at least some of the parameters of the instrument near its input, however, reduces the dynamic range requirements on the remaining components, thereby increasing the accuracy and decreasing the cost of the instrument as a whole.

The scaled signal $K e_m(t)$ is fed by a lead 23 into the storage means 16, which may be a conventional sample-and-hold unit, and a voltage corresponding to a constant quantity $K e_m(0+)$ then appears on the lead 24. Lead 24 runs to the multiplier 17, which contains the preset fraction $\delta$, so that the signal on lead 25 is proportional to $\delta K e_m(0+)$. The timer 18 generates a signal on lead 26 indicative of the interval during which the signal on lead 23 exceeds that on lead 25; that is, the timing signal is indicative of the time $\tau$ required for $e_m(0+)$ to decrease to a value $\delta e_m(0+)$, since the factor K is a common-mode input to the timer 18. The signal level on the lead 26 may indicate the magnitude of $\tau$, in which case the timer 18 may be, for instance, a conventional ramp generator keyed on and off by a variable-threshold Schmitt trigger connected to the leads 23 and 25; alternatively, the signal on lead 26 may be of substantially constant level, keyed on and off by the leads 23 and 25, as will be explained hereinafter. Thus, the timing signal may be indicative of the time $\tau$ by its level, by its duration, or by some other characteristic.

Signals from the leads 24 and 26 are next coupled to the multiplier 19, which generates an output signal corresponding to the quantity $K \tau e_m(0+)$ on a lead 27. Since, by Eq. 7, this quantity represents the capacitance C1 of the circuit 10, a meter 20 having a scale calibrated in terms of capacitance may be connected to the lead 27 for a direct readout or display of the capacitance value. During operation of the instrument, the meter reading will increase linearly from the time switch S1 is closed until the end of the measuring interval. The constant reading attained at the latter time is held by the meter until the instrument is turned off, even if the circuit 10 is disconnected therefrom. Thus, in an application such as monitoring the formation of capacitor anodes, a previously measurement will be retained until another measurement is made; measurements may then easily be made automatically at specified time intervals, so that a current indication of capacitance is always available from the meter 20.

FIGURE 3 illustrates another embodiment of an instrument according to the invention. In this circuit, a switch S2a is moved to connect the lead 11 to a discharge lead 28 for bringing the circuit 10 to an initially relaxed state. The presence of R3 in the discharge path serves to limit the peak discharge current to a safe value. A switch S2b is mechanically coupled to S2a, and disconnects the lead 29 during the flow of discharge current through R3.

Measurement is performed by moving S2a to connect lead 11 to B1 by means of lead 14; S2b then connects lead 29 to R3. Since the electrical scale factor of the instrument may easily be selected so that K is less than unity, the first multiplier may consist of a simple potentiometer or voltage divider R4. The scaled signal from the arm 30 of R4 is coupled to a storage means in the form of a conventional peak detector 31. Use of a simple peak detector, possible because of the fact that $$e_m(0+) = \max[e_m(t)]$$

eliminates the problem of gating the storage means to an exact point in time. A lead 32 couples the peak detector 31 to a potentiometer R5, whose arm 33 is preset to a specified value of the fraction $\delta$. The timing function is provided by a conventional voltage comparator 34 having input leads 35 and 36 connected to the arms 30 and 33 respectively. The comparator 34 produces a first signal level on the lead 37 when the signal on lead 35 exceeds that on the lead 36, and a second signal level otherwise. That is, the duration of the first timing-signal level is indicative of the time $\tau$.

The functions of the multiplier 19 and meter 20 of FIGURE 1 are performed in FIGURE 3 by a gating means 38 and an integrating meter 39. The gate 38 is designed to pass a signal from the lead 32 to a lead 40 whenever the first timing signal is present on the lead 37; the gate may be a mechanical relay, a transistor chopper, or other convenient device. Thus, the lead 40 carries a rectangular-wave signal whose area is proportional to the capacitance C1 of the circuit 10. The area of this wave is computed and displayed by coupling it to an integrating meter 39 in the form of a microcoulometer 41 and a scaling resistor R6. The scale 42, which is read against the gap 43 betwen the mercury columns 44, may be calibrated directly in terms of the capacitance C1. Since the instrument signals will normally be in the form of voltage levels, while the microcoulometer is a current-integrating device, R6 provides a suitable conversion factor in terms of the impedance of the instrument components. R6 may also be utilized to provide other scale factors within the instrument; hence it is shown to be adjustable.

When the circuit 10 consists of a batch of electrolytic capacitor anodes, a form of instrument such as that shown in FIGURE 4 is particularly suitable. The anodes are grown by connecting a source B2 of formation voltage thereto by means of a first position on a switch S3a. Prior to the beginning of the measurement of C1, the switch S3b, which is mechanically coupled to S3a, connects a milliammeter 46 across B2 through a scaling resistor R7. The meter 45 then indicates on a first scale the voltage of B2, which is a parameter to be set into the instrument. Since formation voltage will differ for various batches of anodes, and since the source B2 is the most suitable source of charging voltage for the measurement process, a meter such as 45, having a first scale calibrated in terms of voltage, provides a convenient means for ascertaining this parameter of the instrument. This voltage is then set into the potentiometer R8, which also serves as a current sensor for the instrument.

The switch S3a is next moved to a second position in order to discharge the circuit 10. A small resistance R9 in the discharge path limits the peak current to a safe value. No discharge current flows through R8, and it may remain connected to the instrument during this step. The meter 45 is connected across the circuit 10 through a second position of the switch S3b. This arrangement provides an indication of the state of discharge or relaxation of the circuit 10.

To perform the capacitance measurement, S3a is moved to a third position in order to charge the circuit 10 from the source B2, thereby also moving S3b to couple the meter 45 to a second scaling resistor R10. The scaled input signal is taken from the arm 46 of R8 and fed to the peak detector 31. This detector, the comparator 34 and the potentiometer R5 function as previously described. The lead 32, however, is here connected to the input 47 of an integrating operational amplifier 48 through a resistor R11. The resistor R11 and the feedback capacitances C2, C3 and C4, selected by a range switch S4, determine the scale factor of the amplifier 48. Range switch S4 is used to select a meter scale appropriate to the rough value of the capacitance C1 to be tested. Although range selection may also be done at other points within the instrument, the present arrangement utilizes a linear portion of the amplifier's characteristic on all capacitance ranges without the danger of overloading it on any range.

An arm 49 of R10 may be mechanically coupled to the arm 33 of R5 to provide a single-control selection of the fraction $\delta$. This configuration allows a dial for R8 calibrated only in terms of the voltage of B2 and a dial for R5 calibrated only in terms of $\delta$, thus allowing independent selection of these parameters without a manual arithmetical calculation. Resistor R10 is selected for this purpose over R11 in order to restrict the dynamic range required of the amplifier 48, and thereby to increase its accuracy. Furthermore, the resistance characteristic of R10 and the method of coupling the arms 49 and 33 may be adjusted to compensate to a great extent for the inherent error arising from the mathematical approximation made in Equation 5 above. Wtihin a relatively wide range, the percentage error introduced by the approximation is a linear function of the quantity $1-\delta$, which in turn is a linear function of the distance of the arm 33 from the hot end of R5. For instance, for $1-\delta=0.05$, 0.10 and 0.20, the theoretical errors are $+2.6\%$, $+5.2\%$ and $+10.5\%$, respectively. Hence, the error may be compensated by a rigid coupling between the arm 33 of R10 and the arm 49 of an R10 having a constant percentage resistance variation along its length.

Its scale factor having been established by R11 and the feedback capacitors C2, C3 and C4, the amplifier 48 integrates the voltage on lead 32 with respect ot time. Since this voltage is a constant, the voltage on the amplifier output lead 50 is a ramp function. The multiplication by the value of the time $\tau$ is here accomplished by a gate 51 comprising a transistor Q1 connected between a supply terminal 52 and the power input lead 53 of the amplifier 48. The amplifier is gated on by the constant bias signal existing on the lead 37 during the timing interval by a connection of lead 37 to the base 54 of Q1. Thus, for $t>\tau$, the voltage on lead 50 is a constant indicative of the value of the capacitance C1. This voltage is coupled through R10 and S3b for a direct display of the capacitance on a second scale of the meter 45. A gate such as 51 is advantageous in that it is not coupled through the signal line; its resistance characteristics therefore cannot affect the accuracy of the signals, so that an inexpensive component may be used. An additional advantage of the gate 51 lies in the fact that Q1, when biased at its base 54 by a constant voltage, also serves as a regulator for the supply voltage on lead 53, thus further improving the accuracy of the amplifier 48 without additional expense.

In order to reset the instrument for subsequent measurement, a reset means 55 is provided. The mechanically coupled switches S5a and S5b of the reset means 55 ground the leads 32 and 50, thereby removing the signals stored thereon. After the capacitance is read from the meter 45, closing the switches S5a and S5b will clear the instrument for further use.

Having described several preferred embodiments of my invention by way of illustration rather than as limitations on the scope thereof, I claim:

1. An instrument for measuring the capacitance of a capacitive circuit, comprising a source of potential for charging said circuit, a current sensor providing a signal proportional to a current through said circuit, a first multiplier for scaling said current-sensor signal, a storage means coupled to said first multiplier for holding an initial signal therefrom, a second multiplier connected to said storage means and providing a signal which is a preset fraction of said initial signal, a timer coupled to said current sensor and to said second multiplier for providing a timing signal indicative of an interval during which said current-sensor signal exceeds said second-multiplier signal, a third multiplier coupled to said timer and to said storage means for combining said timing signal and said initial signal into an output signal, and a meter connected to said third multiplier for displaying the magnitude of said output signal, said meter thereby indicating the value of said capacitance.

2. An instrument according to claim 1 further comprising a switch coupled to said circuit and selectively operable to charge said circuit from said source of potential or to discharge said circuit.

3. An instrument according to claim 1 further comprising a switch selectively operable to couple said meter to said source of potential or to said third multiplier, and wherein said meter has a first scale indicative of the voltage of said source and a second scale indicative of the capacitance of said circuit.

4. An instrument according to claim 1 wherein said current sensor comprises a known resistance connected in series with said capacitive circuit.

5. An instrument according to claim 1 wherein said first multiplier comprises a potentiometer.

6. An instrument according to claim 1 wherein said storage means comprises a peak detector.

7. An instrument according to claim 1 wherein said second multiplier comprises a potentiometer.

8. An instrument according to claim 1 wherein said timer comprises a comparator for providing a timing signal having a first level during said interval and a second level at all other times.

9. An instrument according to claim 8 wherein said third multiplier comprises a gate for passing said initial signal from said storage means when said gate is keyed by said first timing-signal level from said comparator, and wherein said meter comprises a microcoulometer coupled to said gate.

10. An instrument according to claim 9 including an adjustable resistance connected between said gate and said microcoulometer.

11. An instrument according to claim 8 wherein said third multiplier comprises an integrating operational amplifier having an input coupled to said storage means and an output coupled to said meter, said amplifier being keyed by a gate coupled to said comparator.

12. An instrument according to claim 11 wherein said gate is a transistor connected in series with a power lead of said amplifier, said transistor having a base connected to said comparator, whereby said transistor is biased on by said first timing-signal level and is biased off by said second timing-signal level.

13. An instrument according to claim 1 wherein said meter comprises a milliammeter and a resistor.

14. An instrument according to claim 13 wherein said resistor is adjustable.

15. An instrument according to claim 14 wherein said resistor is mechanically coupled to said second multiplier.

16. An instrument according to claim 1 further comprising a means for resetting said instrument for subsequent measurements.

17. An instrument according to claim 16 wherein said reset means comprises a pair of grounded switches connected to said storage means and to said third multiplier.

References Cited
UNITED STATES PATENTS

| | | | |
|---|---|---|---|
| 2,835,868 | 5/1958 | Lindesmith | 324—111 |
| 3,042,860 | 7/1962 | Shillington | 324—60 |
| 3,268,809 | 8/1966 | Meyer et al. | 324—60 |
| 3,370,229 | 2/1968 | Hamburger et al. | 324—60 |

RUDOLPH V. ROLINEC, *Primary Examiner.*

JAMES M. HANLEY, *Assistant Examiner.*

U.S. Cl. X.R.

324—111